US008910094B2

(12) United States Patent
Sun et al.

(10) Patent No.: US 8,910,094 B2
(45) Date of Patent: Dec. 9, 2014

(54) RETARGETING SEMICONDUCTOR DEVICE SHAPES FOR MULTIPLE PATTERNING PROCESSES

(71) Applicant: GLOBALFOUNDRIES Inc., Grand Cayman (KY)

(72) Inventors: Yuyang Sun, Wappingers Falls, NY (US); Chidam Kallingal, Poughkeepsie, NY (US); Norman Chen, Poughkeepsie, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/760,571

(22) Filed: Feb. 6, 2013

(65) Prior Publication Data
US 2014/0223390 A1 Aug. 7, 2014

(51) Int. Cl.
*G06F 17/50* (2006.01)
(52) U.S. Cl.
CPC .................................. *G06F 17/5081* (2013.01)
USPC ............................................ 716/55; 716/104
(58) Field of Classification Search
CPC .................................. G06F 17/50; G06F 15/04
USPC ..................................... 716/55, 104
See application file for complete search history.

(56) References Cited

U.S. PATENT DOCUMENTS

| 8,280,191 | B1 | 10/2012 | Avidan et al. |
| 8,392,871 | B2 | 3/2013 | Mansfield et al. |
| 8,401,278 | B2 | 3/2013 | Utsugi et al. |
| 8,631,379 | B2 * | 1/2014 | Chen et al. ..................... 716/132 |
| 8,732,626 | B2 * | 5/2014 | Liu et al. .......................... 716/50 |
| 2011/0305397 | A1 | 12/2011 | Piramuthu et al. |
| 2012/0121204 | A1 | 5/2012 | Ding et al. |
| 2012/0260223 | A1 | 10/2012 | Agarwal |
| 2012/0290908 | A1 | 11/2012 | Kumar et al. |

* cited by examiner

Primary Examiner — Thuan Do
(74) Attorney, Agent, or Firm — Amerson Law Firm, PLLC (57) ABSTRACT

A method includes receiving a design layout file for an integrated circuit device in a computing apparatus. The design layout file specifies dimensions of a plurality of features. The design layout file is decomposed to a plurality of colored layout files, each colored layout file representing a particular reticle in a multiple patterning process. Each of the colored layout files is retargeted separately in the computing apparatus to generate a plurality of retargeted colored layout files. Retargeting each of the colored layout files includes increasing dimensions of a first plurality of features based on spacings between the first plurality of features and adjacent features. The retargeted layout files are combined to generate a combined layout file. Features in the combined layout file are retargeted in the computing apparatus to increase dimensions of a second plurality of features based on spacings between the second plurality of features and adjacent features.

10 Claims, 5 Drawing Sheets

| DesignSpace (nm)→ DesignWidth (nm)↓ | sp1 | sp2 | sp3 | sp4 | sp5 | sp6 | sp7 | sp8 |
|---|---|---|---|---|---|---|---|---|
| wd1 | x | x | x | x | x | x | x | x |
| wd2 | x | x | x | x | x | x | x | x |
| wd3 | x | x | x | x | x | x | x | x |
| wd4 | x | x | x | x | x | x | x | x |
| wd5 | x | x | x | x | x | x | x | x |
| wd6 | x | x | x | x | x | x | x | x |
| wd7 | x | x | x | x | x | x | x | x |
| wd8 | x | x | x | x | x | x | x | x |

RETARGETING SEMICONDUCTOR DEVICE SHAPES FOR MULTIPLE PATTERNING PROCESSES

BACKGROUND

The disclosed subject matter relates generally to integrated circuit device manufacturing and, more particularly, to a pattern based method for identifying design for manufacturing improvement in a semiconductor device.

The formation of various integrated circuit (IC) structures on a wafer often relies on lithographic processes, sometimes referred to as photolithography, or simply lithography. As is well known, lithographic processes can be used to transfer a pattern of a photomask (i.e., also referred to as a mask or a reticle) to a wafer. There is a pervasive trend in the art of IC fabrication to increase the density with which various structures are arranged. For example, feature size, line width, and the separation between features and lines are becoming increasingly smaller. In these sub-micron processes, yield is affected by factors such as mask pattern fidelity, optical proximity effects, and photoresist processing. Some of the more prevalent concerns include line end pullback, corner rounding and line-width variations. These concerns are largely dependent on local pattern density and topology.

Integrated circuit devices are formed in layers. Interconnect structures, such as trenches, vias, etc. are used to form interlayer connections between features, such as lines. For example, a via may be used to connect a line feature, such as a gate electrode, in a first layer to a metal line feature in another layer formed above the first layer. The accuracy at which the interconnect structures align with underlying features affects the functionality of the device. Misalignments may cause performance degradation and or device failure. Misalignment errors may arise from misregistration during the patterning processes to form the features of the various layers (i.e., the layers are not aligned accurately) or due to variations in the dimensions of the features themselves (e.g., due to proximity effects).

Integrated circuit devices are typically designed with some degree of margin to allow for some degree of misalignment. In general, increasing the margin increases the manufacturability of the device by reducing the likelihood of a yield issue. However, there is a trade-off between margin and pattern density. Increased dimensions result in decreased pattern densities. There are design rules for an integrated circuit that specify parameters such as how closely adjacent features may be formed. Design rules are specified in manner that takes into account manufacturing limitations such as overlay and/or optical proximity effects. Increasing the margin for a given feature may result in the violation of one or more of the design rules unless the spacing is increased.

During the design process various tools may be used to check the design. A design rule checker may be used to verify that none of the patterns violates a design rule. A design for manufacturability (DFM) tool may be used to generate a score for the design representing the likelihood that the device can be manufactured without pattern based yield issues. Based on DFM analysis, one or more dimensions of the design shapes may be changed to increase manufacturability. For example, a line may be may widened to provide increased overlap to increase its manufacturability. However, increasing the line width typically decreases the spacing between adjacent features. Thus, the widening is limited by spacing design rules.

DFM analysis is further complicated when multiple patterning processes are used to pattern features on the die. In double patterning, the effective spacing is decreased by patterning different sets of features on the same layer using different exposures. Multiple reticles may be used, such as one reticle for each exposure. The spacing between the features is typically less than what could be achieved suing a single reticle and a single exposure due to optical limitations.

In a single mask patterning process, the design shapes are retargeted based on a Line/Space driven look-up bias table to move in or out the polygon edges. In the context of multiple patterning, there are two or more reticles (colors) for patterning. Therefore, the layout from design is decomposed into two or more layouts (i.e., colors). There are different design rules for the shapes on the same mask (i.e., same color design rule) than for shapes on the multiple reticles (i.e., different color design rules). Retargeting using a single bias look-up table is not effective for maintaining single color and different color design rules in a multiple patterning process.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method including receiving a design layout file for an integrated circuit device in a computing apparatus. The design layout file specifies dimensions of a plurality of features. The design layout file is decomposed to a plurality of colored layout files in the computing apparatus, each colored layout file representing a particular reticle in a multiple patterning process. Each of the colored layout files is retargeted separately in the computing apparatus to generate a plurality of retargeted colored layout files. Retargeting each of the colored layout files includes increasing dimensions of a first plurality of features based on spacings between the first plurality of features and adjacent features. The retargeted layout files are combined in the computing apparatus to generate a combined layout file. Features in the combined layout file are retargeted in the computing apparatus to increase dimensions of a second plurality of features based on spacings between the second plurality of features and adjacent features.

Another aspect of the disclosed subject matter is seen a method that includes receiving a first design layout file for a first reticle for patterning an integrated circuit device in a computing apparatus. The first design layout file specifies a width dimension of a first line and a first spacing between the first line and a second line. The first design layout file is retargeted in the computing apparatus to increase the width dimension based on the width dimension and the first spacing. The first design layout file is combined with a second design layout file for a second reticle for patterning the integrated circuit device in the computing apparatus to generate a combined layout file. The second design layout file specifies a third line disposed between the first and second lines. The increased width dimension of the first line is determined to result in a design rule violation in the computing apparatus and the increase in width of the first line is removed responsive to the design rule violation. The combined layout file is retargeted in the computing apparatus to increase the width dimension of the first line based on the width dimension and a second spacing between the first line and the third line.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
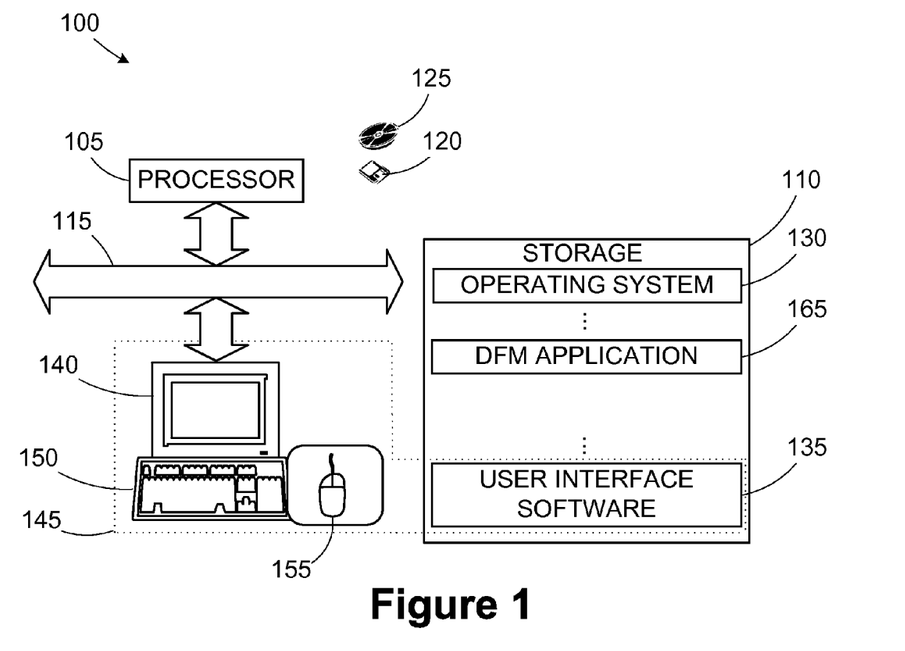
FIG. 1 is a simplified diagram of a computing apparatus for evaluating designs of semiconductor devices in accordance with an illustrative embodiment of the present subject matter.

Referring now to the drawings wherein like reference numbers correspond to similar components throughout the several views and, specifically, referring to FIG. 1, the present subject matter shall be described in the context of an illustrative design analysis computing apparatus 100 for evaluating designs of semiconductor devices. The computing apparatus 100 includes a processor 105 communicating with storage 110 over a bus system 115. The storage 110 may include a hard disk and/or random access memory ("RAM") and/or removable storage, such as a magnetic disk 120 or an optical disk 125. The storage 110 is also encoded with an operating system 130, user interface software 135, and a design for manufacturing (DFM) application 165. The user interface software 135, in conjunction with a display 140, implements a user interface 145. The user interface 145 may include peripheral I/O devices such as a keypad or keyboard 150, mouse 155, etc. The processor 105 runs under the control of the operating system 130, which may be practically any operating system known in the art. The DFM application 165 is invoked by the operating system 130 upon power up, reset, user interaction, etc., depending on the implementation of the operating system 130. The DFM application 165, when invoked, performs a method of the present subject matter. The user may invoke the DFM application 165 in conventional fashion through the user interface 145. Note that although a stand-alone system is illustrated, there is no need for the data to reside on the same computing apparatus 100 as the DFM application 165 by which it is processed. Moreover, the DFM application 165 may include multiple components that may reside on different computing apparatuses 100. Some embodiments of the present subject matter may therefore be implemented on a distributed computing system with distributed storage and/or processing capabilities.

It is contemplated that, in some embodiments, the DFM application 165 may be executed by the computing apparatus 100 to evaluate semiconductor device design data and retarget shapes in the layout to improve manufacturability. Data for the DFM evaluation may be stored on a computer readable storage device (e.g., storage 110, disks 120, 125, solid state storage, and the like).

Portions of the subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
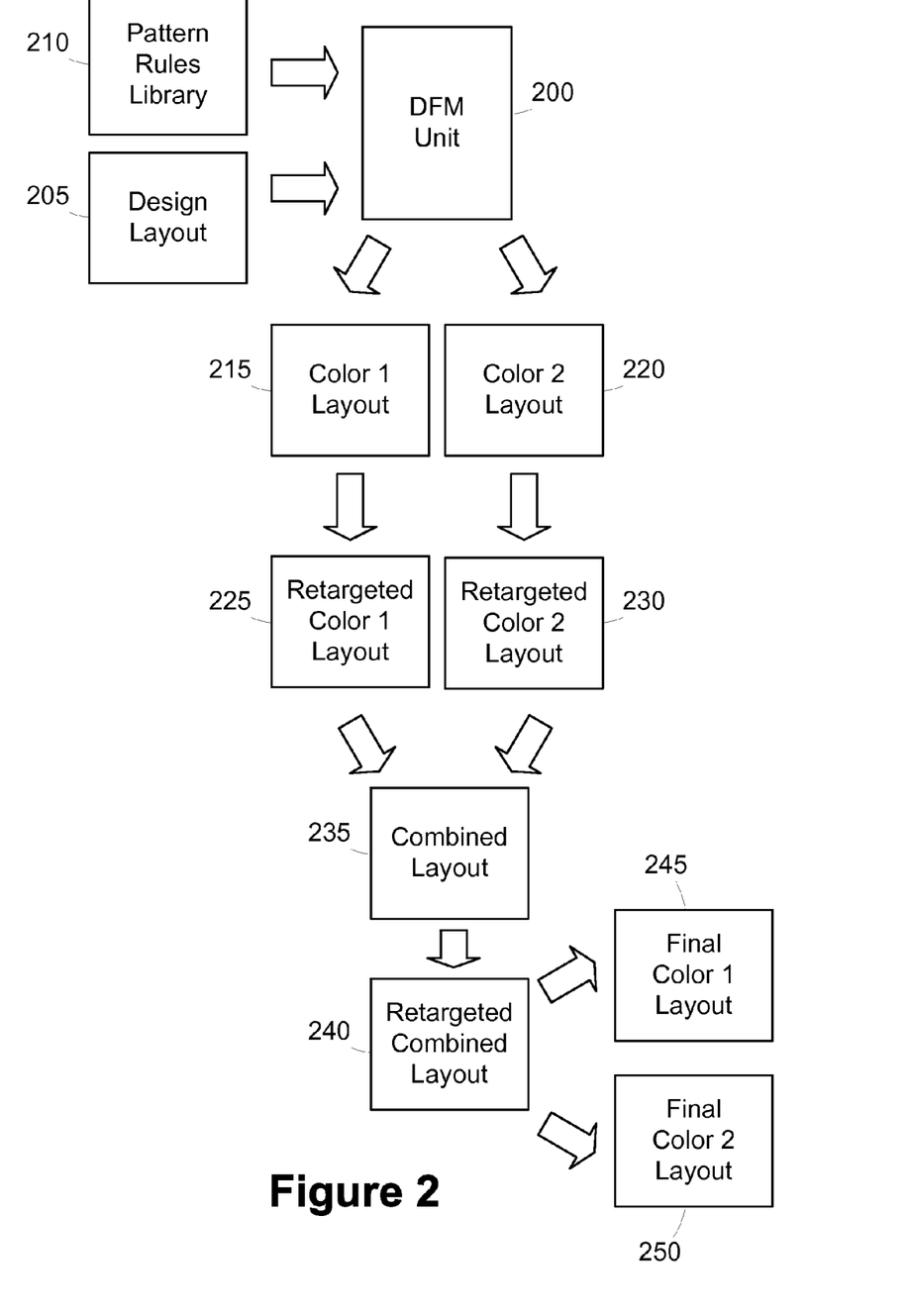
FIG. 2 is a diagram illustrating the operation of a design for manufacturability (DFM) unit implemented by the computing apparatus of FIG. 1.
Figure 3:
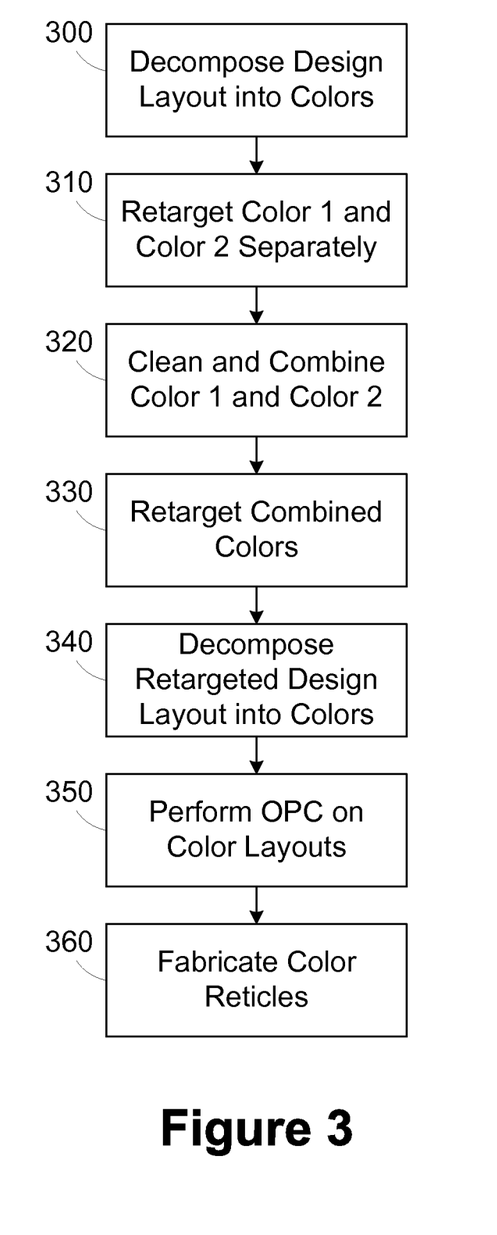
FIG. 3 is a simplified flow diagram of a method implemented by the DFM unit of FIG. 2.

A general process flow for the computing apparatus 100 in implementing the DFM activities of the DFM application 165 is illustrated in the data diagram of FIG. 2 and the process flow diagram of FIG. 3. The computing apparatus 100 implementing the DFM application 165 is represented by a DFM unit 200. Inputs to the DFM unit 200 include a design layout file 205 and a library of pattern rules 210, which includes design rules for pattern checking and bias tables for retargeting. The design layout file 205 is checked for design rule errors prior to the DFM analysis. In block 300, the DFM unit 200 decomposes the design layout file 205 into a color 1 layout file 215 and a color 2 layout file 220. Although the following description is illustrated using two colors for the multiple patterning process, indicating the use of two reticles for the patterning, it is contemplated that the techniques may be applied to any number of reticles for the multiple patterning process.

Figure 4:
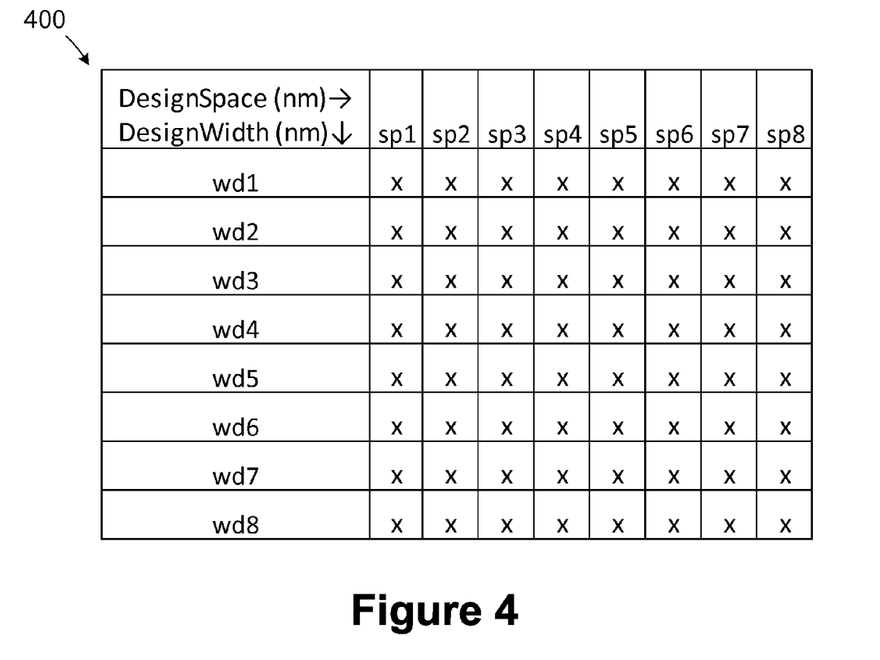
FIG. 4 is a diagram of an illustrative bias table used by the DFM unit of FIG. 2 to retarget features.
Figure 5:
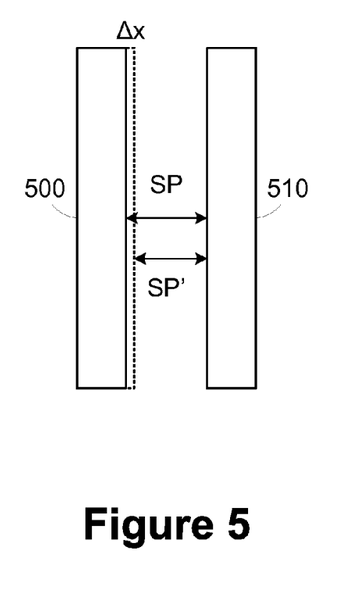
FIG. 5 is a diagram illustrating exemplary features for which retargeting may be completed using the bias table of FIG. 4.

In block 310, the color 1 layout file 215 and the color 2 layout file 220 are retargeted by the DFM unit 200 separately using a first set of retargeting bias values to generate a retargeted color 1 layout file 225 and a retargeted color 2 layout file 230. Those of ordinary skill in the art are familiar with general techniques for retargeting, so they are not described in great detail herein. In general a bias table is employed to evaluate the existing shapes and their spacing relative to other shapes. An edge of a particular shape may be moved depending on its proximity to another shape. FIG. 4 is a diagram of an illustrative bias table 400 for the retargeting, and FIG. 5 illustrates two exemplary lines 500, 510 with a predetermined spacing, sp, between them. In general, retargeting is conducting by moving an edge of the line 500 based on the space available. The design width of the line 500 and the spacing between the lines are used to index the bias table 400 to determine an amount to increase the width of the line, represented by Δx in FIG. 5.

Figure 6:
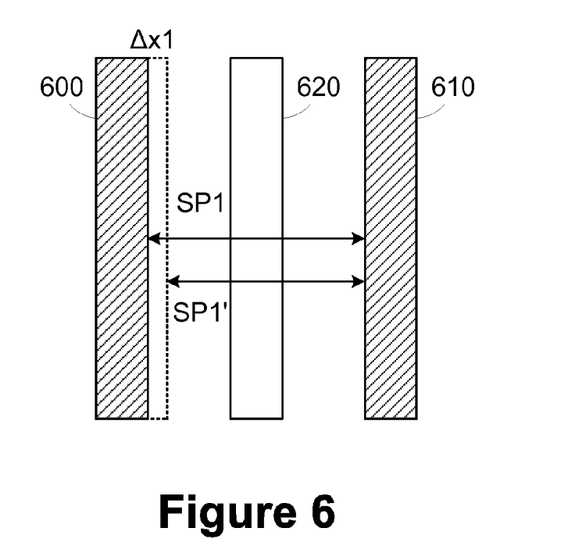
FIG. 6 is a diagram illustrating retargeting of a single color layout file.

Using the bias table 400, the retargeting is completed for all of the lines each of the color 1 and color 2 layout files 215, 220. The retargeting is illustrated in FIG. 6. Lines 600, 610 represent lines form one color and line 620 represents a line from the second color. Because the colors are retargeted separately, the line 620 is not visible during the targeting for color 1. The spacing, SP1, is used for retargeting in the bias table 400, and the width of the line 600 is increased by Δx1. The biases used in the bias table for the retargeting in block 310 are generally limited by lithography resolution for forming the lines 600, 610. Biases may be used for tip-to-tip spacing, line-to-line spacing, and tip-to-line spacing. By retargeting, the DFM unit 200 changes the dimensions of various design shapes to increase manufacturability.

The retargeted layout files 225, 230 are then subjected to a cleaning and combining process in block 320, where design rules are checked to determine if any minimum spacing rules are violated due to the retargeting. The cleaning may be performed on the individual retargeted color 1 and color 2 layout files 225, 230 or after they are combined to generate a combined layout 235. In the cleaning process, any retargeting changes that result in design rule violations are rolled back in block 320, so the affected shapes are returned to their original dimensions.

Figure 7:
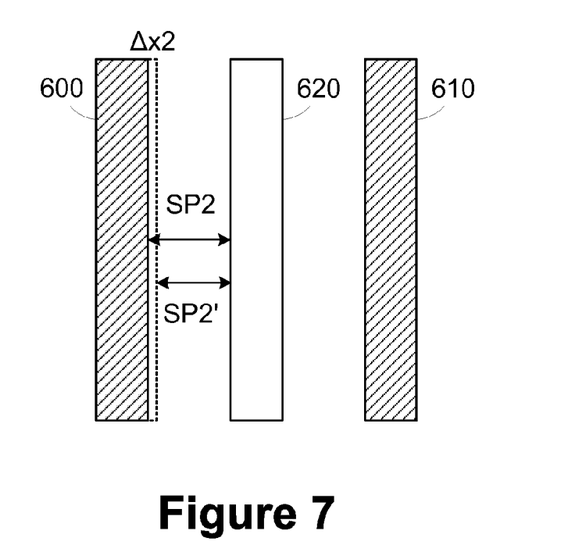
FIG. 7 is a diagram illustrating retargeting of a combined layout file.

A second retargeting process is performed in block 330 on the combined layout file 235 using different parameters than were used in the first retargeting in block 310. For purposes of illustration, assume that the first retargeting that resulted in change in the line 600 of Δx1 resulted in a design rule violation. During the cleaning process, the change would have been rolled back. In the combined layout file 235, both colors are represented as if they were on the same reticle (i.e., the same color). The combined layout file 235 is retargeted using a second set of bias values in a second bias table to generate a retargeted combined layout 240. The second retargeting is illustrated in FIG. 7. Because all of the lines 600, 610, 620 are visible in the combined layout file 235, the spacing used to index the bias table is SP2. Based on the design width of the line 600 and the spacing, SP2, the bias table indicates an edge movement of Δx2.

Relative to the first bias table, the second bias table is less aggressive. All spaces are assumed to be between shapes on two different masks for the first bias table, while all spaces are assumed to be between shapes on the same mask for the second bias table. In general, the spacing rules for the second bias table are dominated by integration limits, such as critical dimension uniformity/tolerance (CDU) for both colors, interlayer overlay, electrical break-down specifications (e.g., minimum insulation space), bias (e.g., top or bottom CD difference), etc. In general, the second retargeting process reclaims some of the increases that were lost in the cleaning process. Because the second bias table is more conservative, the degree of edge movement, Δx2, is less than what was present in the first retargeting using the first bias table, Δx1.

Following retargeting in block 330, the retargeted combined layout 240 is decomposed in block 340 into a final color 1 layout 245 and a final color 2 layout 250 representing each of the reticles in the multiple patterning process. The design process for the reticles used in the multiple patterning process continues in a conventional fashion. In block 350 an optical proximity correction process is performed on the final color 1 and color 2 layout files 245, 250. Those of ordinary skill in the art are familiar with the processes for optical proximity correction. In block 360, the reticles for each color are manufactured.

Retargeting the integrated circuit device layout using the techniques described herein allows improvements in manufacturability of the layout for a multiple patterning process. Both single color and multiple color retargeting are used to increase the level of improvement achievable with only single color retargeting analysis.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
   receiving a design layout file for an integrated circuit device in a computing apparatus, the design layout file specifying dimensions of a plurality of features;
   decomposing the design layout file to a plurality of colored layout files in the computing apparatus, each colored layout file representing a particular reticle in a multiple patterning process;
   retargeting each of the colored layout files separately in the computing apparatus to generate a plurality of retargeted colored layout files, wherein retargeting each of the colored layout files comprises increasing dimensions of a first plurality of features based on spacings between the first plurality of features and adjacent features;
   combining the retargeted layout files in the computing apparatus to generate a combined layout file;
   cleaning the retargeted colored layout files by identifying selected dimension changes that violate design rules and removing the selected dimension changes; and
   retargeting features in the combined layout file in the computing apparatus to increase dimensions of a second plurality of features based on spacings between the second plurality of features and adjacent features, wherein increasing said dimensions of said first plurality of features comprises applying a first bias table indexing dimension changes by design width and spacing to an adjacent feature.

2. The method of claim 1, wherein cleaning the retargeted colored layout files comprises cleaning the retargeted colored layout files prior to generating the combined layout file.

3. The method of claim 1, wherein cleaning the retargeted colored layout files comprises cleaning the retargeted colored layout files after they are combined in the combined layout file.

4. The method of claim 1, wherein retargeting the features in the combined layout file comprises retargeting the features associated with the selected dimension changes that violate the design rules.

5. The method of claim wherein increasing the dimensions of the second plurality of features comprises applying a second bias table indexing dimension changes by design width and spacing to an adjacent feature, wherein the second bias table is different than the first bias table.

6. The method of claim 5, wherein the dimension changes in the second bias table are smaller than the dimension changes in the first bias table.

7. A computing apparatus, comprising:
   storage for receiving a design layout file for an integrated circuit device, the design layout file specifying dimensions of a plurality of features; and
   a design for manufacturability unit operable to:
      decompose the design layout file to a plurality of colored layout files, each colored layout file representing a particular reticle in a multiple patterning process;
      retarget each of the colored layout files separately to generate a plurality of retargeted colored layout files, wherein retargeting each of the colored layout files comprises increasing dimensions of a first plurality of features based on spacings between the first plurality of features and adjacent features and by applying a first bias table indexing dimension changes by design width and spacing to an adjacent feature;
      combine the retargeted layout files in the computing apparatus to generate a combined layout file;
      clean the retargeted colored layout files by identifying selected dimension changes that violate design rules and removing the selected dimension changes; and
      retarget features in the combined layout file in the computing apparatus to increase dimensions of a second plurality of features based on spacings between the second plurality of features and adjacent features.

8. The apparatus of claim 7, wherein the design for manufacturability unit is further operable to retarget the features associated with the selected dimension changes that violate the design rules.

9. The apparatus of claim 7, wherein the design for manufacturability unit is further operable to increase the dimensions of the second plurality of features by applying a second bias table indexing dimension changes by design width and spacing to an adjacent feature, wherein the second bias table is different than the first bias table.

10. The apparatus of claim 9, wherein the dimension changes in the second bias table are smaller than the dimension changes in the first bias table.

* * * * *

UNITED STATES PATENT AND TRADEMARK OFFICE
CERTIFICATE OF CORRECTION

| | | |
|---|---|---|
| PATENT NO. | : 8,910,094 B2 | Page 1 of 1 |
| APPLICATION NO. | : 13/760571 | |
| DATED | : December 9, 2014 | |
| INVENTOR(S) | : Sun et al. | |

It is certified that error appears in the above-identified patent and that said Letters Patent is hereby corrected as shown below:

In the Claims

In claim 5, at column 8, line 1, delete "claim wherein" and insert therefor -- claim 1, wherein --.

Signed and Sealed this
Seventh Day of April, 2015

Michelle K. Lee
*Director of the United States Patent and Trademark Office*